United States Patent
Blanchard et al.

(10) Patent No.: US 10,067,264 B2
(45) Date of Patent: Sep. 4, 2018

(54) METHOD OF CONSTRAINING SEISMIC INVERSION

(71) Applicant: Total S.A., Paris (FR)

(72) Inventors: Thomas David Blanchard, Aberdeen (GB); Pierre Daniel Thore, Aberdeen (GB)

(73) Assignee: Total S.A., Paris (FR)

( * ) Notice: Subject to any disclaimer, the term of this patent is extended or adjusted under 35 U.S.C. 154(b) by 278 days.

(21) Appl. No.: 14/895,960

(22) PCT Filed: May 23, 2014

(86) PCT No.: PCT/EP2014/060684
§ 371 (c)(1),
(2) Date: Dec. 4, 2015

(87) PCT Pub. No.: WO2014/195155
PCT Pub. Date: Dec. 11, 2014

(65) Prior Publication Data
US 2016/0116637 A1 Apr. 28, 2016

(30) Foreign Application Priority Data
Jun. 4, 2013 (GB) .................................. 1309913.0

(51) Int. Cl.
*G01V 99/00* (2009.01)
*G01V 1/30* (2006.01)
*G06F 17/18* (2006.01)

(52) U.S. Cl.
CPC ............ *G01V 99/005* (2013.01); *G01V 1/306* (2013.01); *G01V 1/308* (2013.01); *G06F 17/18* (2013.01);
(Continued)

(58) Field of Classification Search
CPC ...... G01V 99/005; G01V 1/306; G01V 1/308; G06F 17/18
See application file for complete search history.

(56) References Cited

U.S. PATENT DOCUMENTS

| | | | |
|---|---|---|---|
| 7,925,481 B2 * | 4/2011 | Van Wagoner | G01V 1/282 702/2 |
| 2006/0136162 A1 * | 6/2006 | Hamman | G01V 1/306 702/104 |
| 2007/0255499 A1 * | 11/2007 | Strack | G01V 11/00 702/11 |

FOREIGN PATENT DOCUMENTS

| | | |
|---|---|---|
| EP | 165340 A1 | 12/2007 |
| EP | 2020609 A1 | 2/2009 |

(Continued)

OTHER PUBLICATIONS

International Search Report and Written Opinion dated Jan. 7, 2015 for PCT/EP2014/060684.
(Continued)

*Primary Examiner* — Nicholas Tobergte
(74) *Attorney, Agent, or Firm* — Abel Law Group, LLP (57) ABSTRACT

Disclosed is a method a seismic inversion for petrophysical properties of a subsurface volume comprising the steps of: obtaining petrophysical data relating to valid geological and/or dynamical scenarios, converting this data into valid combinations of elastic parameters; projecting the valid combinations of elastic parameters onto a spherical plot; and determining a penalty term from the distances between each cell of the spherical plot and the nearest valid combination of elastic parameters within the subsurface volume. Valid geological and/or dynamical scenarios comprise those which are petrophysically possible. The penalty term is then
(Continued)

used to constrain an inversion minimizing a cost function associated with seismic mismatch between two or more seismic surveys.

20 Claims, 4 Drawing Sheets

(52) U.S. Cl.
CPC .............. *G01V 2210/614* (2013.01); *G01V 2210/6122* (2013.01); *G01V 2210/6169* (2013.01); *G01V 2210/6242* (2013.01)

(56) References Cited

FOREIGN PATENT DOCUMENTS

| GB | 2470760 A | 12/2010 |
| GB | 2481444 A | 12/2011 |
| WO | WO2013012470 A1 | 1/2013 |

OTHER PUBLICATIONS

Bosch, et al. "Petrophysical seismic inversion conditioned to well-log data: Methods and application to a gas reservoir"; Geophysics, Society of Exploration Geophysicists, US, vol. 74, No. 2, Mar. 1, 2009, p. 01-015, XP001520856.

Buland, et al. "Bayesian linearized AVO inversion," Geophysics, Society of Exploration Geophysicists, US, vol. 68, No. 1, Jan. 1, 2003, p. 185-198, XP002558887.

Buland, et al. "Bayesian time-lapse inversion," Geophysics, Society of Exploration Geophysicists, US, vol. 71, No. 3, May 1, 2006, p. R43-R48, XP001243674.

Thore, et al. "4D seismic-to-well tying, a key step towards 4D inversion," Geophysics, Society of Exploration Geophysicists, US, vol. 77, No. 6, Nov. 1, 2012, p. R227-R238, XP001579406.

Search Report for GB1309913.0 dated Nov. 27, 2013.

* cited by examiner

METHOD OF CONSTRAINING SEISMIC INVERSION

The present invention relates generally to the field of geosciences and more particularly to seismic data processing. Specifically the invention relates to a method for extracting the time-lapse changes in 3D seismic data sets collected over a production period, so as to integrate with production data and assist in understanding and managing the extraction of oil and/or gas from reservoirs or the injection of other fluids into the reservoirs. The method also relates to a method of extracting elastic properties from a single dataset (base) in order to determine ultimately the various facies/fluid inside the reservoir.

In the oil and gas industry, seismic surveys are carried out in order to provide subsurface images so that accumulations of hydrocarbons or other fluids might be identified. In a seismic survey, one or several sources emit elastic waves in the form of pressure or ground motion modulation from specific locations (wavefield), at or below the land or sea surface or in a borehole. This wavefield propagates away from the source(s) through the subsurface. Along with this propagation, a fraction of the incident wavefield is reflected from the heterogeneities in the elastic material properties of the subsurface (such as acoustic impedance). This excitation by the incident wavefield generates a reflected wavefield from the heterogeneities, which manifests as pressure, particle motion or some derived quantities and can be detected and recorded at the surface or in a borehole at a number of receiver locations.

Processing of the measurements is undertaken so as to construct a 3D image of the subsurface. Repeated surveys at selected time intervals (days, months, years) allow observation of the changes in, over or under a given reservoir across the time interval—e.g. before oil or gas production starts and after some period of production or injection and to compare the results of measurements. This is called 4D seismic and involves comparing 2D or 3D seismic surveys carried out at different time instances. The aim is to observe changes in the state of the formations and fluids consequent upon production of hydrocarbons from or the injection of fluids into a reservoir. Proper detection of the changes and proper identification of the effects, factors and processes requires specialised acquisition techniques and data processing steps.

The data within the seismic data sets may be first processed to compensate for variations in acquisition (or non-repeatability of seismic surveys) and changes in velocity in the sub-surface.

In EP 1 865 340 to the Applicant, and incorporated herein by reference, the evolution of an oil reservoir in the process of producing is carried out by jointly inverting for the changes in the propagation times and seismic amplitudes of a seismic wavelet along propagation paths in the ground. Inverting allows to back filter, in effect, deriving the original from the solution. A base survey of the reservoir is provided, with a set of seismic traces at a first time T associated to a first velocity field $V_b$; a monitor survey of the reservoir is provided, the monitor survey being taken at a second time $T+\Delta T$, with a set of seismic traces associated to the same positions as in the base survey; the monitor survey is associated to a second velocity field $V_m$. For a set of samples i in the base survey, one computes over the samples of the set the sum S of a norm of the difference between:

the amplitude $b_i$ of the seismic trace in the base survey at each sample i and the sum of the amplitude $m_{i'}$ of the seismic trace at a time-corresponding i' in the monitor survey and the amplitude due to the reflectivity change local to the time-corresponding sample i' induced by the difference between the first velocity field $V_b$ and the second velocity field $V_m$; the time-corresponding sample i' being shifted in time by a time-shift derived from the velocity changes along the propagation path from the surface to time-corresponding sample i'. This sum is minimised to derive the velocity changes from the base survey to the monitor survey and thus characterise the evolution of the reservoir.

This analysis is based on the fact that changes in the reservoir, due to exploitation, will cause changes to the petrophysical properties of the rock and therefore to the seismic velocity field. Practically, oil will be substituted by gas or water and/or the fluid pressure will change, modifying saturation, porosity, permeability and pressure, and consequently in velocity. Changes within the reservoir may also perturb the stress and strain state of the surrounding rocks, further altering their velocities. These changes to velocity will produce time shifts in the seismic response of underlying reflectors and associated changes in reflectivity, causing an alteration of the local wavefield. By using an inversion technique, for every point in the 3D volume, an estimate of the 4D changes having occurred in the time lapse between collection of the base and monitor surveys is provided. It is therefore possible to deduce a field of 4D velocity changes without having to proceed with cross correlation of the traces.

Although the 4D inversion problem seems rather easy to formulate as the minimisation of a difference between base and monitor seismic data, it is an ill-posed problem that has multiple solutions: for instance, any smooth zero-mean velocity changes map into zero time-shift and does not generate any 4D amplitude difference. Moreover the inversion becomes even more highly non-linear for fields that induce subsidence and have potentially large time shift.

In EP 1 865 340, the crucial step is in minimising the difference between base and monitor seismics. Essentially this is an optimisation problem which requires minimising of the objective function or cost function over all choices of variables i.e. velocity changes that satisfy the modelled constraints. Usually the cost function is computed over all the available time-samples but it can be also calculated for decimated time samples or the sample number can be increased by interpolation to improve the accuracy of the solution. Moreover, the inversion could be carried out for the most relevant layers of the field (including overburden, reservoir, and underburden) obtained using stratigraphic information or any other strategy. The advantage of working with sub-samples is that it can make the inversion better posed.

However, as in almost any inverse problem, this cost function does not go identically to zero. In fact the forward model used for this inversion, is just an approximation which implies some assumptions, and therefore a residual still exists. To partially overcome this problem a constraint is added to the cost function. However, it is difficult to choose an optimal weight for this constraint. Several strategies can be used and a lot of interpretation is required, meaning that the solution is not unique.

With increasing quality of seismic acquisition and processing providing better 4D seismic repeatability, the translation of 4D anomalies into quantitative dynamic properties (pressures, saturations) is becoming more feasible. Conversion into real changes in reservoir properties is extremely beneficial, as it makes reservoir monitoring and management much easier and also provides reservoir engineers with seismic information in their domain. Many of the current prestack 4D inversion (dIp, dIs) schemes are data driven, with few constraints applied (possibly geometrical constraints or masks), allowing any combination of elastic parameters to be solved for. In addition to this, the majority of prestack 4D inversion schemes only deal with amplitude information and are heavily dependent upon the liberalized approximations of reflectivity given by Aki and Richards, which have been shown in 3D to be a hopelessly ill-conditioned problem. The 4D amplitude versus offset (AVO) inversion problem is defined in the same way, where some key 4D effects have been shown to fall along the worst determined eigenvector. The problem is better conditioned when time-shift and amplitude information is simultaneously used in the inversion.

Much work on the inversion of dynamic parameters involves two independent inversions. The first inversion is from the 4D seismic data to the 4D elastic parameters, and the second is the transformation of theses elastic parameters into true reservoir parameters. Examples of this type of inversion are becoming more abundant. It is also a well known fact that seismic inversion results are non-unique, and this fact is responsible for the ever-increasing emphasis of performing stochastic based inversions.

It would therefore be desirable to improve the constraint of seismic inversion.

SUMMARY OF INVENTION

In a first aspect of the invention there is provided a method of modelling a subsurface volume comprising the steps of:
obtaining petrophysical data relating to valid geological and/or dynamical scenarios within the subsurface volume, wherein valid geological and/or dynamical scenarios comprise those which are petrophysically possible;
converting said petrophysical data into valid combinations of elastic parameters;
projecting said valid combinations of elastic parameters onto a spherical plot; and
determining a penalty term from the distances between each cell of the spherical plot and the nearest valid combination of elastic parameters.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Amplitude-versus-offset (AVO) inversion is an ill-posed problem and it is commonly admitted that only two parameters can be extracted from the AVO. More recently, it has been shown that not only is 4D AVO an ill-posed problem, but there is also a large null space in the inversion. This means that, with the same elastic data, a large ensemble of rock physics solutions are equivalent. The first common way of by-passing the problem is to perform the inversion in the rock physics domain. This approach relies on an accurate Petro Elastic Model (PEM) and therefore on prior knowledge of certain petrophysical data (e.g. porosity) throughout the reservoir. Another method is to use a Bayesian inversion, but the weighting of the prior can be extremely cumbersome.

To illustrate the problem, consider the pre-stack inversion AVO term $R(\theta)$. This is a very ill-posed and badly determined problem (considering here the 3D situation):

$$R(\theta) = \left(\left(\frac{1}{2} + \frac{1}{2}\tan^2\theta\right)\frac{\Delta V_P}{V_P} + \left(\frac{1}{2} - 2\alpha^2\sin^2\theta\right)\frac{\Delta \rho}{\rho} - 4\alpha^2\sin^2\theta\frac{\Delta V_s}{V_s}\right)$$

and therefore:

$$\Delta R(\theta) \approx \left(\left(\frac{1}{2} + \frac{1}{2}\tan^2\theta\right)\frac{\Delta(\Delta V_P)}{\hat{V}_P} + \left(\frac{1}{2} - 2\alpha^2\sin^2\theta\right)\frac{\Delta(\Delta\rho)}{\hat{\rho}} - 4\alpha^2\sin^2\theta\frac{\Delta(\Delta V_s)}{\hat{V}_s}\right)$$

where $\theta$ is the seismic angle of incidence, $\Delta V_p/V_p$ is the relative change of the p-wave velocity at the interface between two layers (e.g. sand/shale), $\Delta V_s/V_s$, is the relative change of the s-wave velocity at the interface between two layers, $\Delta\rho/\rho$ is the relative change of the density at the interface between two layers, $\alpha$ is $V_s/V_p$ (i.e. the mean value) and $\hat{V}_p$, $\hat{\rho}$ and $\hat{V}_s$ are the mean values of $V_p$, $V_s$ and $\rho$ respectively (as relative changes are being estimated).

The skilled person will appreciate that other equations are possible which are not functions of $\rho$, $V_p$, $V_s$, but other combinations of elastic parameters e.g. Impedances $I_p$, $I_s$, or $\rho$, $\lambda$, $\mu$ (Lamé parameters). The skilled person will further appreciate that it is possible to compute the constraint in essentially the same way for all sets of parameters.

Solving the system of equations in a linear manner would mean solving for:

$$\begin{bmatrix} \Delta R(\theta_1) \\ \Delta R(\theta_2) \\ \vdots \\ \Delta R(\theta_n) \end{bmatrix} = \begin{bmatrix} \frac{1}{2} + \frac{1}{2}\tan^2\theta_1 & \frac{1}{2} - 2\alpha^2\sin^2\theta_1 & 4\alpha^2\sin^2\theta_1 \\ \frac{1}{2} + \frac{1}{2}\tan^2\theta_2 & \frac{1}{2} - 2\alpha^2\sin^2\theta_2 & 4\alpha^2\sin^2\theta_2 \\ \vdots & \vdots & \vdots \\ \frac{1}{2} + \frac{1}{2}\tan^2\theta_n & \frac{1}{2} - 2\alpha^2\sin^2\theta_n & 4\alpha^2\sin^2\theta_n \end{bmatrix} \begin{bmatrix} \frac{\Delta V_P}{V_P} \\ \frac{\Delta \rho}{\rho} \\ \frac{\Delta V_S}{V_S} \end{bmatrix}$$

for any number of angles (equal or greater than 3), assuming a constant α. This matrix equation can be represented in shorthand as: d=Am.

To analyse properties of the system, a covariance matrix can be calculated:

$$C_m = (A^T C_d^{-1} A)^{-1}$$

By way of example, say that a data uncertainty or data error is introduced, for example 0.0001 (reflection coefficient units). Considering then an example (best case) of angles θ of 0-45 degrees with the uncertainty at each angle of 0.0001, for α=0.5:

$$C_m = \begin{pmatrix} 0.0033 & -0.0031 & 0.0045 \\ -0.0031 & 0.0030 & -0.0043 \\ 0.0045 & -0.0043 & 0.0063 \end{pmatrix}$$

The principal axis and vectors can then be determined to find the best determined and worst determined combinations of parameters:

$$\lambda_m = \begin{pmatrix} 3.5 \times 10^{-6} & 0 & 0 \\ 0 & 5.8 \times 10^{-5} & 0 \\ 0 & 0 & 1.25 \times 10^{-2} \end{pmatrix}$$

$$\upsilon_m = \begin{pmatrix} 0.83 & -0.22 & 0.51 \\ 0.51 & 0.72 & -0.49 \\ -0.26 & 0.66 & 0.71 \end{pmatrix}$$

where $\lambda_m$ are the eigenvalues of the covariance matrix $C_m$ and $\upsilon_m$ are the associated eigenvectors. These in turn reveal the worst determined and best determined combinations of parameters.

From the first column of each of these examples, it can be seen that the best determined combinations of parameters are when:

$$\frac{\Delta \rho}{\rho} = \frac{0.51}{0.83} \frac{\Delta V_p}{V_p} \quad \frac{\Delta V_s}{V_s} = \frac{-0.26}{0.83} \frac{\Delta V_p}{V_p}$$

and from the last column of each of these examples, it can be seen that the worst determined combinations of parameters are when:

$$\frac{\Delta \rho}{\rho} = \frac{-0.49}{0.51} \frac{\Delta V_p}{V_p} \quad \frac{\Delta V_s}{V_s} = \frac{-0.71}{0.51} \frac{\Delta V_p}{V_p}$$

Figure 1:
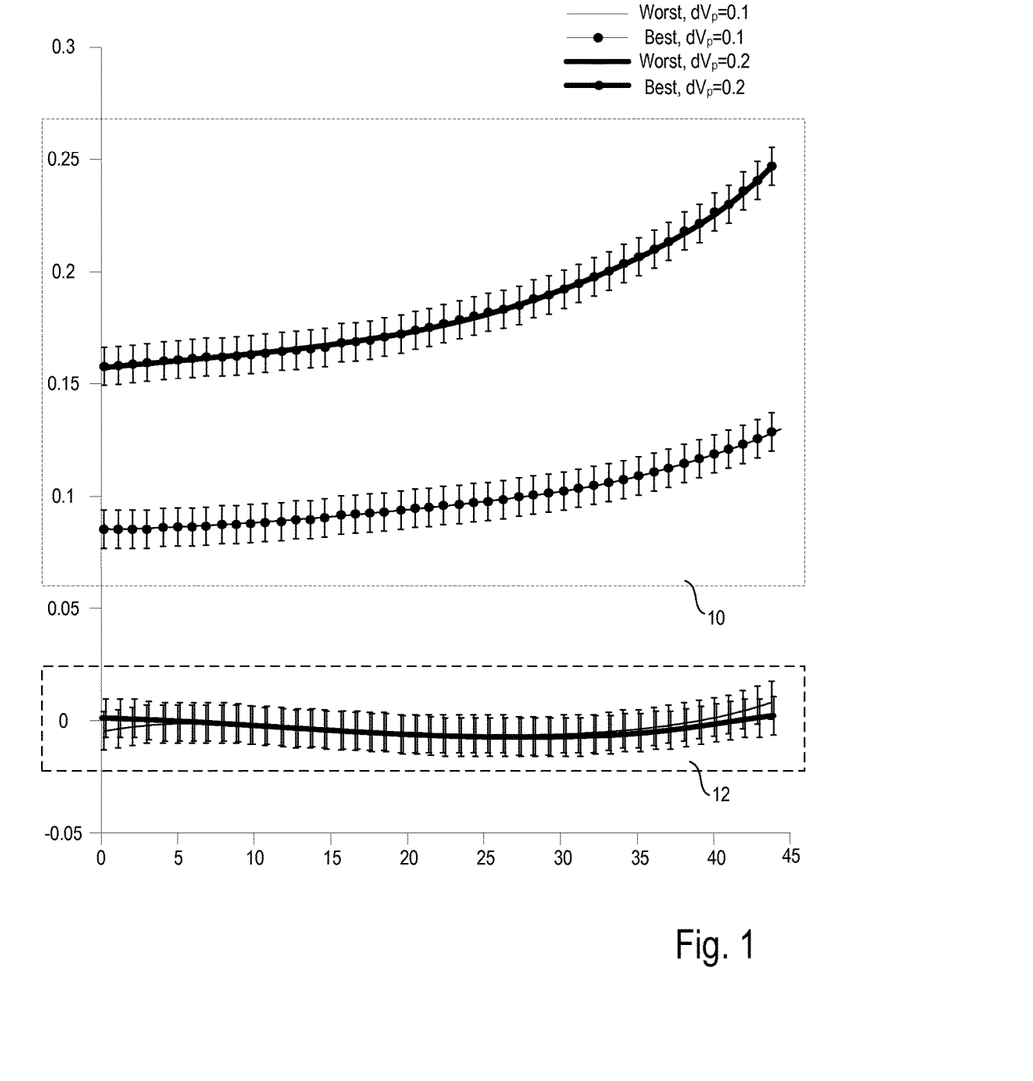
FIG. 1 is a graph of reflectivity (y-axis) against angle (x-axis) showing AVO curves for an increase in $\Delta V$, for both the best determined and worst determined combinations of parameters.

FIG. 1 shows calculated reflectivity curves for two values of $\Delta V_p$: $\Delta V_p$=0.1 (thin lines) and $\Delta V_p$=0.2 (thick lines), representing 9 and 10 percent increases respectively. The lines within rectangle 10 comprise plots for the best determined combinations of parameters, while the lines within rectangle 12 comprise plots for the worst determined combinations of parameters. The Figure highlights how solutions of the worst determined combinations of parameters for $\Delta V_p$=0.1 and $\Delta V_p$=0.2 will be virtually indistinguishable from each other (there are two curves shown within rectangle 12 which overlap for most angles).

$V_p$ is highly constrained by the time shift Δt, near angle and far angle. Δρ is determined through near angle and mid angle amplitudes. $\Delta V_s$ is determined through mid angle offsets. As the majority of the cost is reduced through the time shift:

$V_p$ fits the time shift

ρ then compensates amplitudes at near offsets.

$V_s$ then compensates for ρ at mid offsets.

As a consequence, unconstrained pre-stack seismic inversions will generally not be adequate to provide realistic combinations of elastic parameters for dynamic inversion.

It is proposed to constrain AVO inversions in a way that is simple, efficient and respects the information contained in the data (not a hard constraint). This approach introduces an additional cost into the inversion process that is a function of the combination of elastic parameters only. The magnitude of the elastic parameters has no impact on the additional cost. By using this domain, loose prior information is provided to the elastic inversion which enables selection of model solutions that are consistent with prior geological and dynamic considerations.

Figure 2:
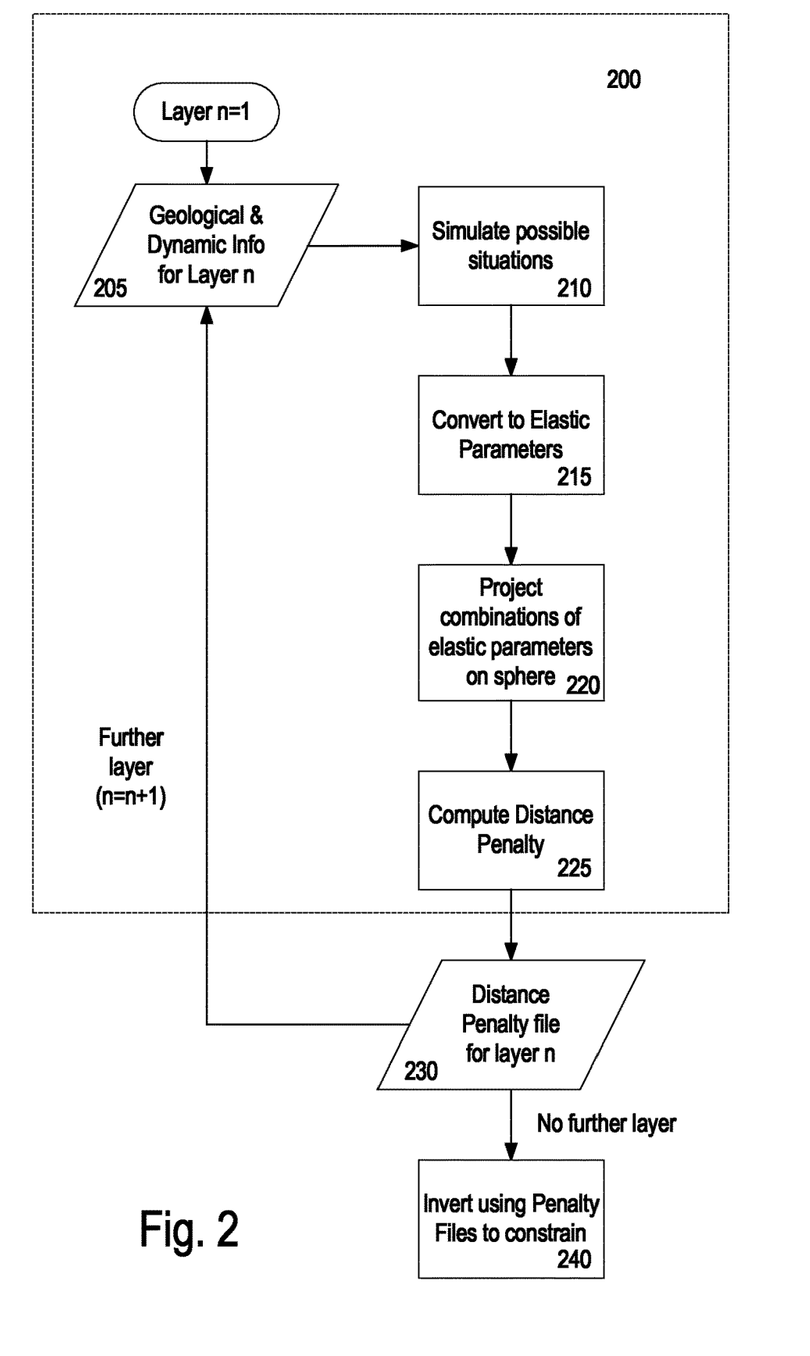
FIG. 2 is a flowchart illustrating a method according to an embodiment of the invention.

FIG. 2 is a flowchart of a method according to a first embodiment. The approach entails a first main step 200 of creating distance penalties for combinations of elastic parameters. This may be done on a region-by-region basis for a particular reservoir, such that separate penalties are created for each reservoir layer, for example.

Creation of distance penalties 200 may be performed using geological and dynamic information 205 for the reservoir, or region thereof. This information may be obtained from a reservoir model, geological model and/or the well. Alternatively or in addition, the geological and dynamic information can also come from prior knowledge of expected geology and/or expected changes in dynamic properties (a priori assumptions).

The geological and dynamic information is used to create all possible (i.e. valid) situations relative to a geological/dynamical context 210. This may be done using a Monte-Carlo simulation, for example. Possible situations are those which could occur in actuality (i.e. those situations that are petrophysically sensible) as opposed to mathematical solutions which are nonsensical in practice. The geological and dynamic information may be applicable to a particular region (e.g. layer) of the reservoir, with the possible situations being determined for that region. This is particularly the case where the predominant fluid interaction for a region is known. Examples of predominant fluid interaction which may be known for a particular region include: water replacing oil, oil replacing water, gas replacing water, water replacing gas, pressure changes only.

These possible/valid solutions are converted that into elastic parameters 215. This may be done using a rock physics model or petro-elastic model (PEM), for example. Using such a model, all expected changes in $V_p$, $V_s$ and ρ (for example, other elastic parameters may be chosen) expected within a region of the reservoir should be forward modelled. This step may comprise normalising all of the combinations of $V_p$, $V_s$ and ρ that are bigger than a certain threshold (it would not be expected to detect very small changes in seismic properties (e.g less than 0.5%)).

Figure 3:
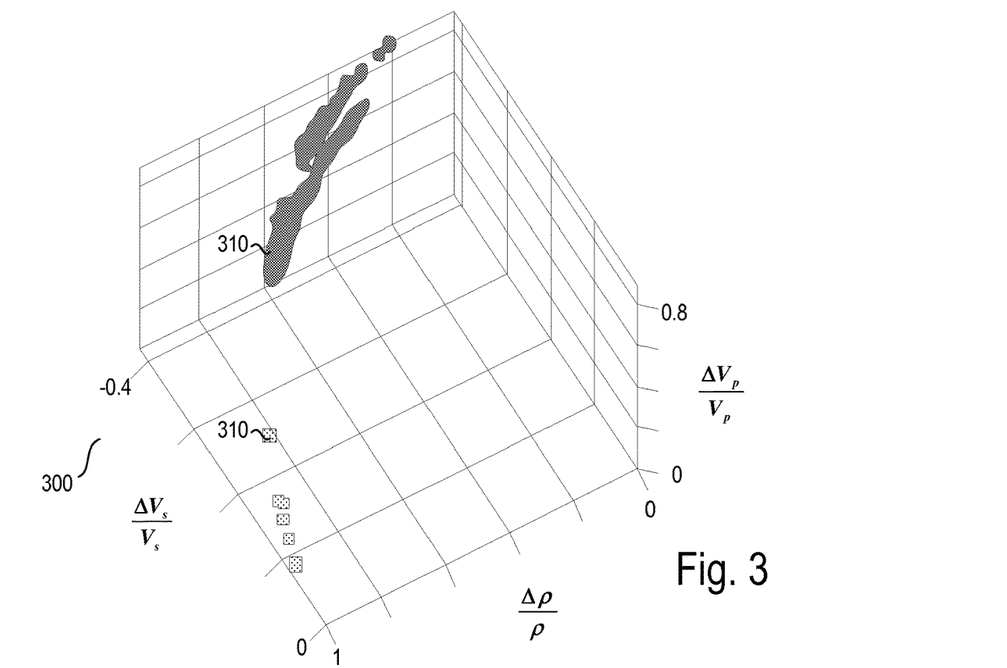
FIG. 3 is a plot of valid combinations of parameters in spherical space.

The combinations of elastic parameters are then projected onto spherical space (step 220) comprised of a 3D spherical plot of changes in $V_p$ against changes in $V_s$ against changes in density p. FIG. 3 shows an example plot 300, comprising calculated valid combinations of elastic parameters 310 expected around a water injector, including a variety of 3D geological properties.

At step 225 a distance penalty is computed by measuring the minimum "great circle distance" or orthodromic distance (i.e. the distance along the surface of the sphere) between each cell of the sphere (360 azimuths*180 inclinations) to the nearest simulated combination (or valid solution). This may such that, for example, a cell representing a valid solution is attributed a distance of 0, while the maximum distance on the sphere (between two antipodal points) is attributed a distance of 1. A normalisation can be applied to scale the distance between chosen values; this should not simply be a linear transformation if the constraint is to be made sharper. In the 3D example (described below), isolated points may be removed. Other distance computation methods are possible. For example, rather than computing the minimum distance, an average distance to all valid points or an average distance to the n nearest points can be used should the data be noisy.

Figure 4:
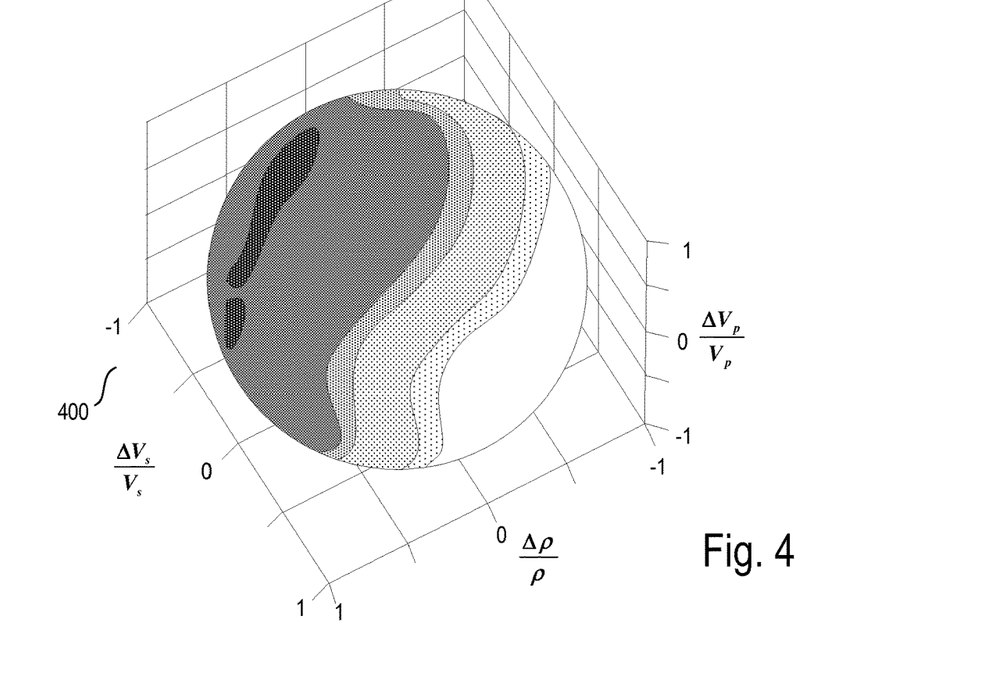
FIG. 4 is a plot of a cost function resultant from the plotted valid combinations of parameters in FIG. 3.

FIG. 4 shows a resultant cost function 400 produced using the data of FIG. 3. Darker shading indicates lower cost, with conversely the unshaded region being the highest cost.

Output is a distance penalty 230 for the region or layer in question (or for the whole reservoir, if the method is not being performed on a region-by region basis). Distance penalties for other layers can then be calculated, such that a different constraint sphere is assigned to different parts of the model (usually each layer) via an associated penalty.

Once all penalties have been calculated, the elastic penalty can be used to constrain the inversion. During the inversion 240 the penalty term is applied to the cost function associated with seismic mismatch $\Sigma$, which is always between 0 and 1 in this embodiment (although it may take other values in different embodiments).

The computation of the constraint may be done in the same process as the inversion. During the inversion, at each evaluation of the cost function, the current inversion parameters ($V_p$, $V_s$, $\rho$) can be projected onto the sphere, with the penalty term corresponding to the value of the constraint at this position.

Figure 5:
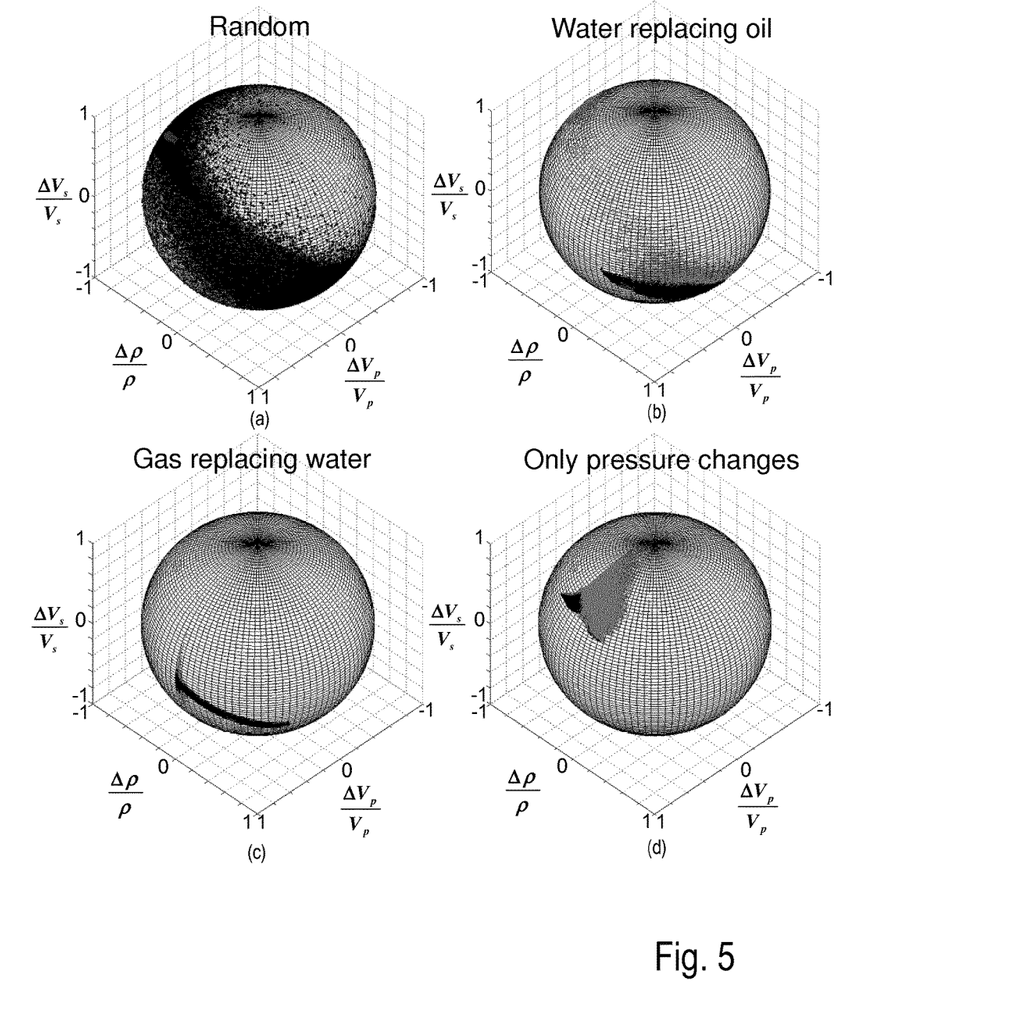
FIG. 5 shows spherical plots of valid elastic parameter combinations for a number of scenarios: (a) a random scenario; (b) water replacing oil; (c) gas replacing water; and (d) pressure changes only.

FIGS. 5(a)-(d) show spherical plots of valid elastic parameter combinations for a number of scenarios. FIG. 5(a) shows a random scenario (as you may expect to see if performing the methods herein throughout whole reservoir without regionalisation). FIG. 5(b) shows a plot for a region/layer where the predominant effect is water replacing oil. FIG. 5(c) shows a similar plot where the predominant effect is gas replacing water, and FIG. 5(d) shows a plot where there have only been pressure changes. In each case, the dark regions represent valid combinations. These figures illustrate the advantage of determining constraints on a regional or layer-by-layer basis. It is likely that the predominant effect of any given layer is known, and therefore only valid combinations for such a scenario needs to be plotted As a result, FIGS. 5(b) to (d) show far fewer and more localised valid solutions than FIG. 5(a), therefore resulting in a better constrained inversion.

The cost function may take the form of:

$$C = \sum_{j=1}^{M} \sum_{i=1}^{N} \left( b(t_i, \theta_j) - m\left(t_i - \sum_{1}^{i} \frac{\Delta V_{Pk}}{V_{Pk}}, \theta_j\right) - \Psi * \left(\left(\frac{1}{2} + \frac{1}{2}\tan^2\theta_j\right)\frac{\Delta V_{Pk}}{V_{Pk}} + \left(\frac{1}{2} - 2\alpha^2\sin^2\theta_j\right)\frac{\Delta \rho_k}{\rho_k} - 4\alpha^2\sin^2\theta\frac{\Delta V_{Sk}}{V_{Sk}}\right)\right) + \lambda^2 D\left(\frac{\Delta V_{Pk}}{V_{Pk}}, \frac{\Delta \rho_k}{\rho_k}, \frac{\Delta V_{Sk}}{V_{Sk}}\right)$$

Wherein the first two terms are the base and monitor traces respectively, the third term is the AVO term and the fourth term is the constraint, with D being the calculated distance penalty.

While the examples above relate to 4D seismic inversions, the concepts herein are also applicable to 3D seismic inversions. The main difference in the latter case is the need to locate an origin for the spherical plot as an initial step. With 4D seismic (measuring changes of elastic parameters over time), there is a natural origin representing "no change", i.e. the initial conditions at zero time. With 3D seismic data sets there is no such natural origin.

To find the origin, the data (elastic values of the logs) is initially grouped according to facies log, i.e. the data is grouped according to whether it predominately comprises sand/shale/carbon etc. This grouping can be made according to true geological facies or seismically distinguishable facies. The origin for the $V_p$ axis is calculated from the average (midpoint) of the values of $V_p$ for the different groups. The origin for the $V_s$ and $\rho$ axes are similarly found from averages of the values of $V_s$ and $\rho$ for each group. For example, where the facies log shows only sand and shale, the origin will be calculated thusly:

$$V_{Porigin} = \frac{V_{Psand} + V_{Pshale}}{2}; V_{Sorigin} = \frac{V_{Ssand} + V_{Sshale}}{2}; \rho_{origin} = \frac{\rho_{sand} + \rho_{shale}}{2}$$

Once the origin is found, the rest of the method is much the same as that shown in FIG. 2. However, a rock physics model is unnecessary when petro-elastic information can be obtained from the well-log (elastic values have been measured at the well). If it is not the case, "synthetic" elastic logs can be computed from petro-physics logs using a rock physics model. In this embodiment, valid combinations of parameters $V_p$, $V_s$ and $\rho$ (not changes in these parameters as with the 4D plots) are projected onto spherical space centred on the calculated origin.

The techniques described herein provide a model driven prestack inversion workflow that inverts for changes in the dynamic properties of the reservoir. The (3D or 4D) prestack elastic inversion is constrained using a combination of rock physics and reservoir engineering information. The workflow also allows for the simultaneous inversion of amplitudes and time-shifts.

The techniques described herein stabilize the elastic inversion, with results showing almost no additional residual energy in the seismic data compared to an unconstrained inversion. This means these constraints provide a cost-equivalent solution which is better suited to the dynamic changes that are expected to be seen in the reservoir. This is extremely beneficial since it is not the elastic parameters that matter in reservoir characterization but rather petrophysical parameters (in 3D) or dynamic parameters (in 4D). These techniques are particularly beneficial for using seismic data in building geomodels or using time lapse seismic in quantitative assisted history matching.

The constraint can be implemented throughout the 3D space or on a layer by layer basis. The latter approach is particularly suited where the predominant fluid effect in each layer is known, i.e. which fluid is being replaced by which fluid in each layer.

By computing more realistic but cost-equivalent inversion results, the inversion for pressure and saturation yields more useful data, in that it is more consistent with the expected changes in reservoir properties. This allows for the interpretation of 4D seismic directly in the dynamic domain (e.g. changes in pressure and water saturation), potentially enabling the detection of by-passed oil, or reservoir compartmentalisation. A better understanding of the dynamic reservoir properties helps improve future well placement and prediction of reservoir performance.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method of performing a geometric inversion of seismic data comprising the steps of:
   obtaining petrophysical data relating to valid geological and/or dynamical scenarios within a subsurface volume comprising a hydrocarbon reservoir or region thereof, wherein valid geological and/or dynamical scenarios comprise those which are petrophysically possible;
   converting said petrophysical data into valid combinations of elastic parameters;
   projecting said valid combinations of elastic parameters onto a spherical plot;
   determining a penalty term from the distances between each cell of the spherical plot and the nearest valid combination of elastic parameters;
   performing an inversion which inverts for changes in dynamic properties of the hydrocarbon reservoir by minimizing a cost function associated with seismic mismatch between two or more seismic surveys and at least a synthetic dataset computed from said elastic parameters; wherein said penalty term is used to constrain said inversion; and
   using the result of said inversion in predicting performance of said hydrocarbon reservoir.

2. A method as claimed in claim 1 wherein the projection of said valid combinations of elastic parameters onto a spherical plot comprises projection onto the surface of a plotted sphere, and the determined distance between each cell of the spherical plot and the nearest valid combination of elastic parameters is the great circle distance.

3. A method as claimed in claim 1 wherein, when the inversion is a 3D inversion, one of the surveys is the synthetic dataset computed from the inverted parameters.

4. A method as claimed in claim 1 comprising determining the penalty term for only a region of said subsurface volume, wherein said valid geological and/or dynamical scenarios and therefore said valid combinations of elastic parameters are those which are valid for that particular region.

5. A method as claimed in claim 4 comprising determining different penalty terms for different regions within the subsurface volume.

6. A method as claimed in claim 4 wherein each region comprises a different layer of the subsurface volume.

7. A method as claimed in claim 4 comprising the step of using knowledge of the predominant fluid effect in a region in determining valid geological and/or dynamical scenarios for that region.

8. A method as claimed in claim 1 comprising the step of using a simulation to determine said valid geological and/or dynamical scenarios within the subsurface volume.

9. A method as claimed in claim 8 wherein said simulation is a MonteCarlo simulation.

10. A method as claimed in claim 1 comprising the step of using a rock physics/petro-elastic model to convert said petrophysical data into valid combinations of elastic parameters.

11. A method as claimed in claim 1 comprising the step of determining valid combinations of elastic parameters directly from observation.

12. A method as claimed in claim 1 wherein said method comprises 4D modelling of said subsurface volume and the spherical plot is a plot of changes over time in any three elastic parameters, one on each axis.

13. A method as claimed in claim 1 wherein said method comprises 3D modelling of said subsurface volume and the spherical plot is a plot of any three elastic parameters, with one elastic parameter on each axis.

14. A method as claimed in claim 13 comprising determining an origin of the spherical plot of elastic values wherein said determination comprises:
   grouping said petrophysical data according to their facies or seismic-facies characteristics;
   calculating average values for the elastic parameters being plotted, from the values of each of these parameters for each group of facies characteristic; and
   locating said origin at the point defined by said calculated average values for each parameter.

15. A method as claimed in claim 12 wherein said elastic parameters comprise any three of: p-wave velocity or impedance, s-wave velocity or impedance, density and any Lamé parameter.

16. A method as claimed in claim 1 further comprising the step of using the results of said method to aid hydrocarbon recovery from a reservoir.

17. A computer program comprising computer readable instructions which, when run on suitable computer apparatus, cause the computer apparatus to perform the method of claim 1.

18. A computer program carrier comprising the computer program of claim 17.

19. Apparatus specifically adapted to carry out the steps of the method as claimed in claim 1.

20. A method as claimed claim 1 comprising using the result of said inversion in determining future well placement.

* * * * *